April 18, 1933.  S. HEATH  1,904,733
PROPELLER
Filed June 28, 1929   2 Sheets-Sheet 1
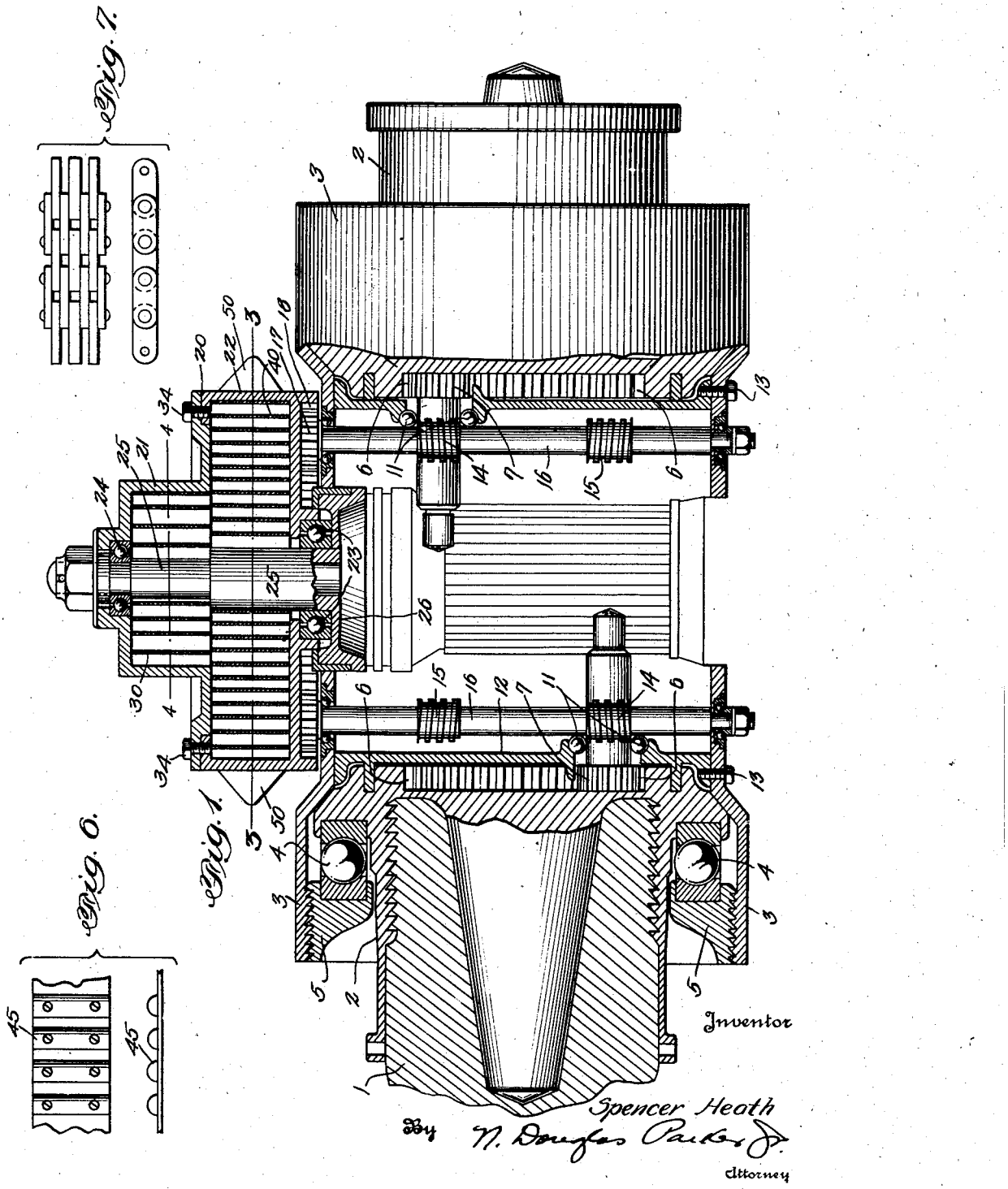

April 18, 1933.　　　S. HEATH　　　1,904,733
PROPELLER
Filed June 28, 1929　　　2 Sheets-Sheet 2
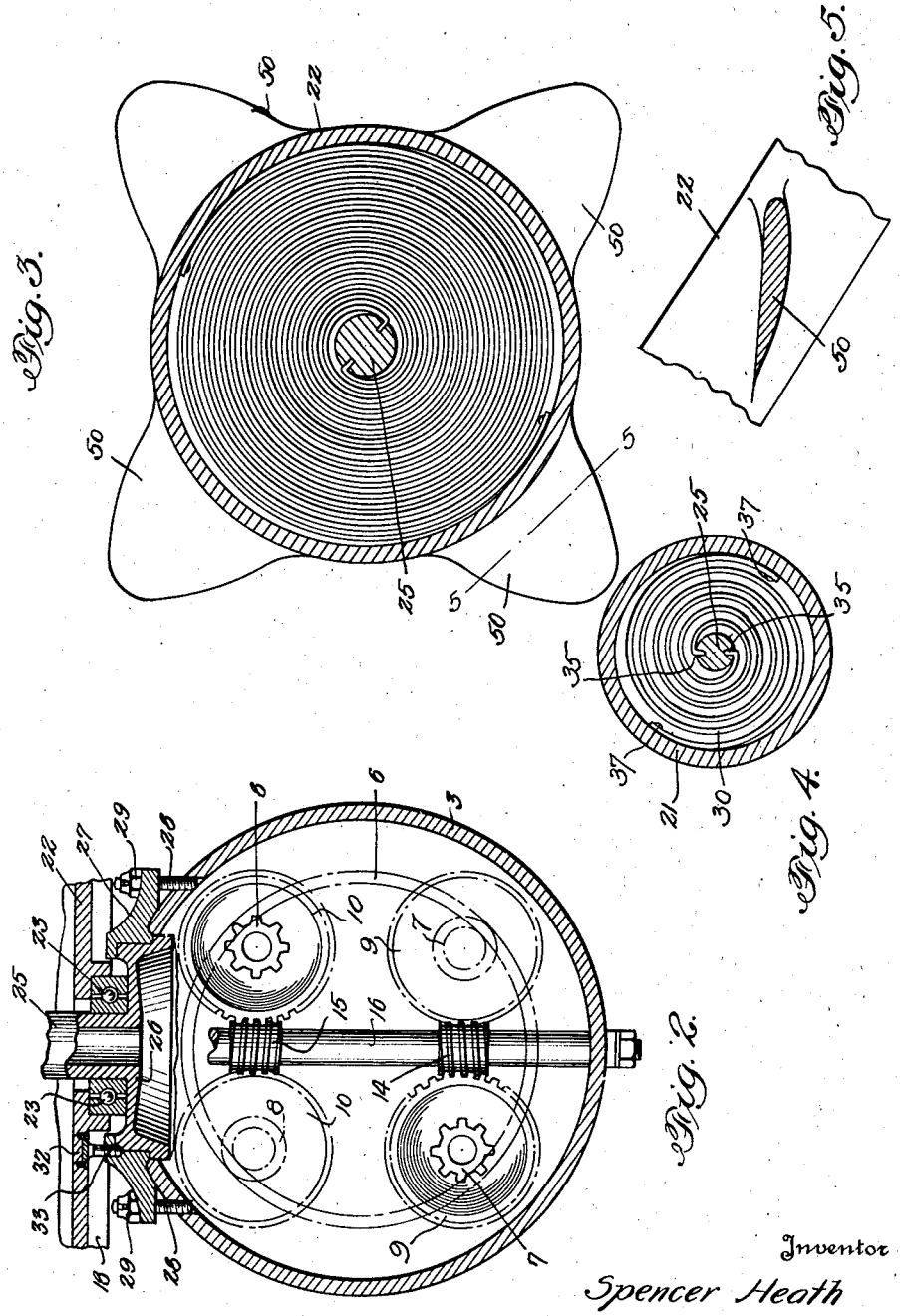

Patented Apr. 18, 1933

1,904,733

UNITED STATES PATENT OFFICE

SPENCER HEATH, OF ELKRIDGE, MARYLAND, ASSIGNOR TO THE AMERICAN PROPELLER COMPANY, OF BALTIMORE, MARYLAND, A CORPORATION OF MARYLAND

PROPELLER

Application filed June 28, 1929. Serial No. 374,462.

This invention relates to propellers. It has particular reference to propellers for aircraft with adjustable blades that can be varied in pitch during flight, this variation in pitch being effected by centrifugal force or by the force of the air passing over and around the hub of the propeller or by both of these forces acting together and each modifying or supplementing the other.

An object of the invention is to provide pitch changing and pitch controlling mechanism non-reversible in its action so that although motion may be transmitted to the blades to change their pitch it will not be possible for unbalanced forces upon the blades to act reversely upon the pitch changing mechanism.

Another object is to provide mechanism that will keep the pitch of the blades minimum during take-off and climb yet cause the pitch to increase in consequence of diminished head resistance in level flight.

A further object is to provide mechanism that will tend to increase or decrease the pitch of the blades of the propeller in accordance with changes of speed of air flow over and around the hub of the propeller.

With the above-mentioned and further objects in view I have embodied my invention in various mechanisms, one form of which is illustrated by the accompanying drawings, in which—

Figure 1 is a longitudinal section;
Figure 2 is a cross section;
Figure 3 is a section on line 3—3 of Figure 1;
Figure 4 is a section on line 4—4 of Figure 1;
Figure 5 is a section on line 5—5 of Figure 3; and
Figures 6 and 7 are alternative forms of the centrifugally acting element 40 shown in Figure 3;
Corresponding reference numerals are employed throughout.

The blades of the propeller have threaded butt ends 1 which are screwed into ferrules 2. These ferrules are retained and supported within the hub 3 by the ball bearings 4 which are held in position by the threaded ring nuts 5. The inner end of each ferrule carries an internal toothed gear 6 which engages at opposite positions the two pinions 7 and 8 which are integral respectively with worm gears 9 and 10 mounted with ball bearings 11 on the flanged assembly plate 12 which is positioned suitably within the hub 3 and secured therein by screws 13. The two worm gears 9 and 10 for each blade are engaged by the two worms 14 and 15 which are of low pitch angle non-reversing type. They are threaded on shaft 16 located in line with worm gears 9 and 10 and with its axis parallel with the axis of rotation of the propeller. This shaft 16 carries on its outboard end a pinion 17, one for each blade, and these two pinions 17 are engaged by the internally toothed ring gear 18.

20 is a governor housing. It is made in two parts 21 and 22, front and rear, and is mounted by ball bearings 23 and 24 upon the stub shaft 25 having a base 26 which is held by the ring clamp 27 and the stud bolts and nuts 28 and 29, the shaft 25 projecting forward coaxially with the center bore of the propeller. The rear part 22 of the governor housing carries the ring gear 18. The front part 21 contains a clock spring 30 tension of which rotates the governor housing to the position of engagement between the stop 32 on the governor housing and stop 33 on the base 26 of the stub shaft 25. The tension of the clock spring is adjusted by removing the screws 34 and rotating the front portion of the governor housing to a new position and reinserting the screws 34. For the sake of balance and symmetry of action the clock spring 30 is made in two parts forming a double spiral as shown in Figure 4, the inner ends 35 of the two parts being bent sharply to engage grooves on opposite sides of the stub shaft 25.

Similarly, the outer ends of the two parts of the spring are secured by rivets 37 at opposite sides of the governor housing 21. The rear part 22 of the governor housing is of much greater diameter than the front part. This rear part contains the centrifugally acting element 40. This element is in the form of a double spiral spring similar to clock spring 30 except that it is much larger and is wound in the opposite direction. It likewise is engaged in grooves on opposite sides of the stub shaft and riveted to the interior of the governor housing, all as shown in Figure 3.

The purpose of this centrifugally acting element 40 is to act in opposition to the clock spring 30. The spring 30 is so wound that it moves the governor housing and internal gear 18 in the direction opposite from the direction of rotation of the propeller. This movement acting through pinions 17, worms 14 and 15, gears 9 and 10, pinions 7 and 8 and internal gears 6 reduces the pitch of the propeller blades until the stops 32 and 33 engage each other with the blades in lowest pitch position. In this position when the propeller is at rest or revolving slowly the tension of the element 40 is insufficient to resist the clock spring 30 but it is so proportioned and adjusted that when the propeller exceeds its desired speed the centrifugal stresses in element 40 give it a tension sufficient to overcome the tension of spring 30 and thus rotate the internal gear 18 in the same direction as the rotation of the propeller with consequent increase of the pitch of the blades and restoration of the desired propeller speed. If the propeller speed is too far reduced the lessened centrifugal action on the element 40 renders it again incapable of resisting the tension of clock spring 30 which now moves the internal gear 18 in the opposite direction, thus reducing the pitch of the propeller until normal speed is resumed. Centrifugal force somewhat increases the tension of spring 30 at the same time that it acts upon the element 40 but the small diameter and mass of the spring 30 make its increase of tension relatively very small. It may thus be stated that the control mechanism including the internal gear 18, is actuated by the differential of centrifugal force between the oppositely wound elements 30 and 40. I contemplate the employment in the element 40 of plain band or strip material similar to the material of spring 30; nevertheless desirable alternatives may be found in Figures 6 and 7. In Figure 6 the band or strip material is loaded with a series of bars or weights 45 riveted or otherwise secured to the band. With this loaded band forming the element 40 equal or greater tension from centrifugal force may be obtained with a lesser number of turns or lengths of bands.

Figure 7 illustrates a form of flat chain that may be used in place of one of the two flat bands for the centrifugally acting element 40. Whether plain bands, loaded bands or articulated links are employed they will of course be attached at one end to the stub shaft 25, spirally wound and their other ends attached to the walls of the governor housing 20.

In connection with governing the pitch of the blades it is important to note the high gear ratio between the worm shafts 16 and the internal gears 6 in the blade ferrules. It has proved desirable that this gear ratio be from 180 to 1 to 360 to 1 so that one turn of the worm shaft causes a movement of from one to two degrees in the propeller blade. This high ratio of gearing relieves the worms and worm shafts of all heavy stresses and consequent wear, contributes to their light weight and greatly facilitates their being made non-reversible. The pinions 17 on the worm shafts have only about one sixth to one twelfth as many teeth as the gear 18 which drives them. The worm shafts therefore turn from six to twelve times faster than the gear that drives them and some two or three hundred times faster than the gears that they ultimately drive. It is a particular feature of this invention that a non-reversing member is included in the gear train and that this non-reversing member shall be intermediate between the driving member and the ultimate driven member and of faster rotational speed than either of them.

The invention as thus far described provides for governing the propeller at practically constant speed throughout all the varying conditions of take-off, climbing and level flight. During the time of acceleration before take-off and while climbing the resistance to be overcome is much greater than in level flight. It is therefore necessary or at least very desirable before take-off and while climbing or in case of stalling in the air or other low air speed condition that the propeller shall allow its engine to turn at the speed of maximum power. At the same time considerations of engine maintenance and fuel economy make it extremely desirable that the propeller turn at a diminished speed in level flight. This is commonly accomplished by throttling the engine, but with the propeller speed thus reduced the pitch of its blades remains at the minimum owing to the lessened centrifugal governing effect at the reduced propeller speed. It is therefore desirable to provide other or supplementary means for increasing the propeller pitch during level or descending flight or other condition of low head resistance or high wind speed. With such means employed the speed of the engine may be held within the desired limits by increasing its torque resistance instead of by closing the throttle, thus obtaining the full power capacity of which the engine is capable at its moderated speed, the while keeping adequate pitch still available in case it is desired to throttle the engine and fly with less than full engine power.

The means I have provided for this purpose consists of a number of short vanes or blades 50 carried upon the periphery of the governor housing 20 as shown in front elevation by Figure 3 and by cross section in Figure 5. The rotational sense of these vanes is the same as that of the propeller; that is, if the propeller is a right hand screw then these vanes also form a right hand screw; if the propeller is left handed in its rotational sense then the vanes 50 also are left handed. Now these vanes are preferably of much lower pitch than the propeller and are so formed and proportioned that they may function in two opposite ways, depending on the velocity of the air stream flowing over them. If the air stream is relatively slow, as before takeoff or during climb or at stalling, then the vanes exert a tractive effect upon the air stream. This imparts to the governor housing and the internal gear 18 a left hand turning movement (assuming the propeller to be the customary right hand tractor) which assists the clock spring 30 in holding the stops 32 and 33 in mutual engagement and the propeller blades at their minimum pitch. As the airplane gains speed the air stream increases and the left hand turning movement in the gear 18 diminishes. A further increment of air speed extinguishes the left hand movement in the gear 18 (thus freeing the governing mechanism from any restraint due to air flow on the vanes) and a still further increase of air speed at the front of the propeller hub causes the air now to impinge on the forward side of the vanes 50 thus imparting now a right hand movement to the gear 18 and causing the pitch of the propeller to increase by virtue of the high air speed even at propeller speeds too low for the centrifugally acting member 40 to take effect for raising the pitch. It may thus be seen that while at conditions of very low air speed the left hand torque caused by the fins tends to restrain the centrifugal governing mechanism from increasing the pitch until maximum permissible engine speed is reached, yet when higher air speeds are attained the action of the vanes is reversed into a right hand torque which creates a positive unbalance between the action of the clock spring 30 and the centrifugally acting member 40 of the governing mechanism. This raises the pitch of the propeller and so restrains the engine to a moderate and economical speed with its maximum full power speed always available in response to diminished air flow in case of entering upon a climb or any upward pointing of the plane that otherwise might result in a stall.

It may be noted that the rotational sense of the vanes 50 being the same as that of the propeller, the rotation of the air stream passing over its hub tends to increase their efficacy for imparting right hand torque to the ring gear 18. Since this rotation is more pronounced at the lower air speeds, it may prove advantageous to allow the vanes 50 to receive right hand torque from the air stream at all times in which case the clock spring 30 will be adjusted with slightly greater tension and the vanes will tend only to raise the pitch of the propeller upon acceleration of the air speed.

It is of course to be understood that the vanes 50 may be varied in number and size and that they may be adjustably mounted and that they may be in any suitable position for operating or modifying the operation of the pitch changing mechanism.

What I claim is:

1. Control mechanism comprising in combination, a shaft adapted for rotation, a housing rotatably mounted thereon and two flexible spiral members wound oppositely about said shaft and attached thereto at one end and to the housing at their other end, each of said spiral members consisting of two similar parts symmetrically arranged to form a double spiral around said shaft, said mechanism being actuated by the differential of centrifugal force between the oppositely wound spiral members.

2. Control mechanism comprising in combination, a shaft adapted for rotation, a housing rotatably mounted thereon, and two flexible spiral members wound oppositely about said shaft and attached thereto at one end and to the housing at their opposite ends, said mechanism being actuated by the differential of centrifugal forces set up in the two spiral members, one of said spiral members being of greater mass than the other.

3. Control mechanism comprising in combination, a shaft adapted for rotation, a housing rotatably mounted thereon, and two flexible spiral members wound oppositely about said shaft and attached thereto at one end and to the housing at their opposite ends, said mechanism being actuated by the differential of centrifugal forces set up in the two spiral members, one of said spiral members being of greater diameter than the other.

4. The combination with a propeller having a hub and blades adjustably mounted therein, of mechanism for transmitting simultaneously to each blade equal angular displacement in either direction about its own axis, control mechanism to govern the angular displacement, means responsive to centrifugal force for operating said control mechanism at low air speeds and means responsive to air impact and modifying said centrifugally responsive means for operating the control mechanism at high air speeds.

5. The combination with a propeller having a hub and blades adjustably mounted therein, of mechanism for transmitting simultaneously to each blade equal angular displacement in either direction about its longitudinal axis, control mechanism to govern the angular displacement, and means responsive to increased speed of the air flow passing over the propeller hub for operating the control mechanism to increase the pitch of the propeller blades.

6. The combination with a propeller having a hub and blades adjustably mounted therein, of mechanism for transmitting simultaneously to each blade equal angular dislpacement in either direction about its longitudinal axis, control mechanism to govern the angular displacement, and means for actuating the control mechanism operating to increase the pitch of the propeller blades, said means being responsive to an increase of speed in the air flow passing over the propeller hub, the said control mechanism being coaxial with the propeller.

7. The combination with a propeller having a hub and blades adjustably mounted therein, of mechanism for transmitting simultaneously to each blade equal angular displacement in either direction about its longitudinal axis and control mechanism to govern the angular displacement, said control mechanism being coaxial with the propeller and having a plurality of vanes of aerofoil section of the same rotational sense as the blades of the propeller.

8. In a propeller control mechanism, in combination, two coaxial, flexible, spiral members acting in opposition to each other, one of said members being of greater mass and diameter than the other.

9. The combination with a propeller of control mechanism comprising in combination a coaxially disposed shaft, a housing rotatably mounted thereon, a spring within said housing, a centrifugally acting member in opposition to said spring and vanes mounted on the periphery of said housing.

10. In combination, a hub, a plurality of blades carried thereby, centrifugally responsive means for varying the pitch of said blades and means for modifying the operation of said first named means and responsive to decreased head resistance for increasing the pitch of the blades.

11. The combination with a propeller having a hub, a plurality of blades rotatably mounted therein, mechanisms for simultaneously rotating each of said blades about their longitudinal axes for varying the pitch, a housing removably supported coaxially with respect to the propeller, and centrifugally operable control means for governing the operation of said mechanism, said control means being carried by said housing and completely enclosed therein.

12. The combination with a propeller having a hub, a plurality of blades rotatably mounted therein, mechanisms for simultaneously rotating each of said blades about their longitudinal axes for varying the pitch, said mechanisms including non-reversible elements whereby the blades are locked in any position of adjustment, a housing removably supported coaxially with respect to the propeller, and centrifugally operable control means for actuating said mechanisms, said control means being carried by said housing and completely enclosed therein.

13. The combination with a propeller having a hub, a plurality of blades rotatably mounted in said hub, mechanisms for simultaneously rotating each of said blades about their longitudinal axes for varying the pitch, a housing rotatably supported coaxially with respect to the propeller and forwardly of the axis of the blades, means within the housing for automatically rotating the latter during operation of the propeller, and means for drivably connecting said housing and said mechanisms whereby rotation of said housing will actuate said mechanisms to automatically vary the pitch of the propeller blades.

14. The combination with a propeller having a hub and blades adjustably mounted therein, of mechanism for transmitting simultaneously to each blade equal angular displacement in either direction about its longitudinal axis, and control mechanism to govern the angular displacement, said transmitting mechanism including a gear train having a non-reversible gear element, a rotatable driving gear, and an ultimately driven gear, said non-reversible gear element being intermediate said driving gear and driven gear and turning faster than either of said gears.

15. The combination with a propeller having a hub and blades adjustably mounted therein, of mechanism for transmitting simultaneously to each blade equal angular displacement in either direction about its longitudinal axis, control mechanism to govern the angular displacement, said transmitting mechanism including a gear train having a non-reversible gear element, a driving gear, and an ultimately driven gear, said non-reversible gear element being intermediate the driving and driven gears and turning faster than either of said gears, and a housing cooperating with said hub, said control mechanism being secured within said housing coaxial with the propeller and adapted to rotate therewith.

16. The combination with a propeller having a hub and blades adjustably mounted therein, of mechanism for transmitting simultaneously to each blade equal angular displacement in either direction about its longitudinal axis, and control mechanism to govern the angular displacement, said transmitting mechanism including a gear train having a non-reversible gear element, a driving gear, and an ultimately driven gear, said non-reversible gear element being intermediate said driving and driven gears and turning faster than either of said gears, said control mechanism being adapted to operate in response to centrifugal force.

In testimony whereof I affix my signature.

SPENCER HEATH.